May 27, 1930.　　　　L. W. JONES　　　　1,760,502
STOCK AND DIE
Filed June 22, 1929
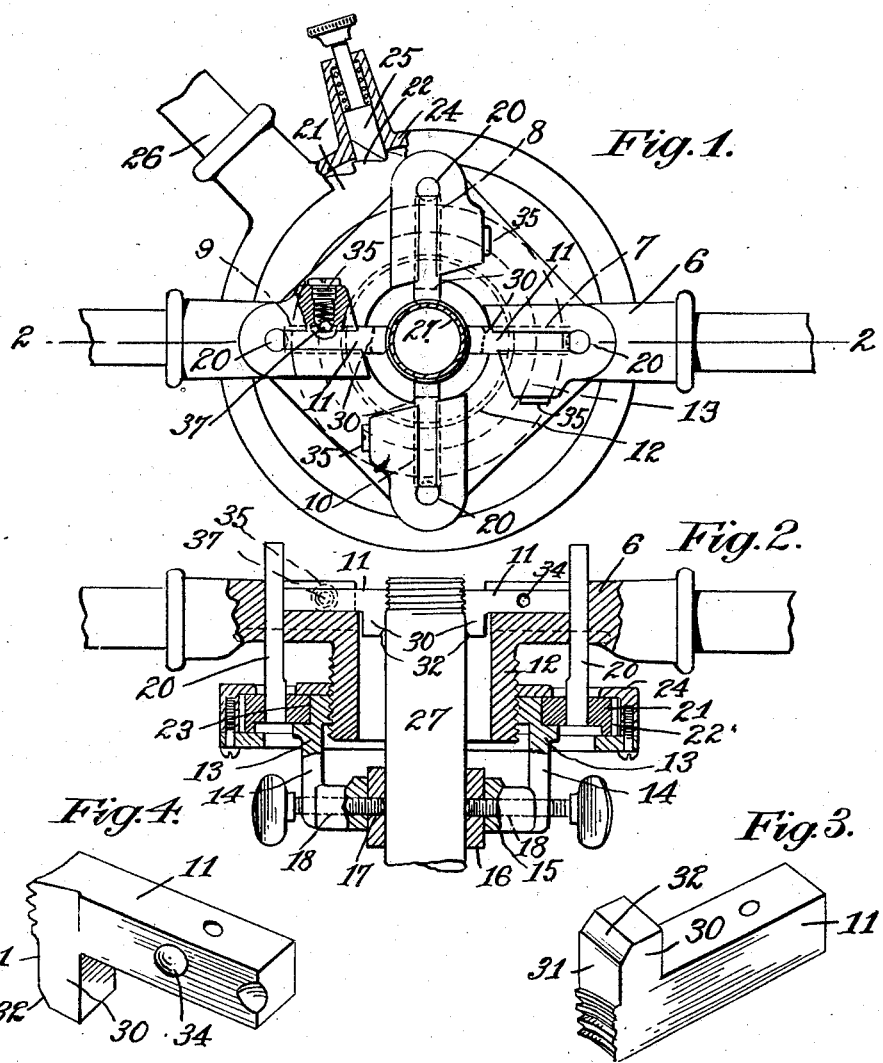
Inventor
L.W. Jones
By his Attorney Wm. H. Reid.

Patented May 27, 1930

1,760,502

UNITED STATES PATENT OFFICE

LOUIS W. JONES, OF NEW YORK, N. Y., ASSIGNOR OF ONE-HALF TO FRANCIS J. CAR-NELLI, OF JAMAICA, NEW YORK

STOCK AND DIE

Application filed June 22, 1929. Serial No. 372,935.

This invention relates to tools or implements for cutting screw threads on a tube or cylinder, and particularly for cutting the threads on pipes of various sizes; wherein a head or stock is provided with means for carrying a circular series of cutters or jaws that are radially arranged to secure with their inner ends at about the same distance from the axis of the stock or head at the bore of the head, whereby on presenting a pipe at this bore and turning the head at the same time causing a relative movement to advance the pipe end into the bore to engage the jaws, a screw thread will be formed on the pipe.

In such devices in use at present, where a pipe is presented that does not have the end regular and extending in a plane perpendicular to the axis of the pipe the thread is likely to be cut irregular as the head in turning has a tendency to cant or shift out of the perpendicular plane, and the thread will not be symmetrical, and will not fit the nipple or connection into which the pipe is screwed, in the proper manner.

The object of the present invention is to provide the several cutters or jaw members with guide portions or walls beyond the teeth or cutting portions, in the direction in which the pipe enters the head, that will serve to engage the pipe and center it so that its axis will be coincident with the axis of the head or stock.

In the accompanying drawing showing one embodiment of my invention:—

Fig. 1 is a face view of die stock.

Fig. 2 is a cross section on the line 2—2 of Fig. 1.

Figs. 3 and 4 are views of the jaws or chasers detached.

In Figs. 1 and 2, I show a form of die stock in very frequent use, that has means for receiving the jaws as at present in use, and which can also receive the new form of jaws. This die stock when the pipe or rod is held rigid in a suitable member such as a vise, is applied to the pipe, and then rigidly secured thereto in the proper position, and a screw and nut portion, when the actuating part is turned, will cause the jaws to feed axially relative to the pipe at the proper advance corresponding with the thread that is formed on the pipe. As shown in the drawing the stock comprises an annular frame 6 provided with slots 7, 8, 9 and 10 in which slide the cutting jaws 11. This frame has a threaded extension sleeve 12 on which turns a ring frame 13. This frame has rearwardly extending arms 14 with carrying sleeve 15. The latter carries a loose collar 16 with threaded holes 17, to receive screws 18, that pass through threaded holes 19 in the sleeve 15. A set of four rods 20, extend back from the ring frame 6 and carry a ring 21 provided with ratchet teeth 22 on its periphery. This ring 21 rides in a groove 23 in the frame 13. An annular channel ring 24 rides on the edge of the ring 21, and carries a spring pawl 25, to engage the ratchet teeth and turn the ring in one direction. This ring is swung by a handle 26 extending outwardly therefrom.

In the use of this device the pipe 27 is inserted in the ring 16, and the end to be threaded is brought to engage the jaws 11, and the screws 18 are set up to clamp the pipe in the ring and hold it in this position. The pipe will have a rather loose fit in the ring 16 when clamped by the screws and its end will not always aline with the jaws. The pipe being clamped in a vise, the frame carrying the screw 18 and the nut member 13 will also be held stationary. The ring 21 will be now swung by the handle 26, that will also swing the frame 6 carrying the jaws 11, that will also turn the threaded sleeve 12. The latter since the nut 13 is stationary will cause the frame 6 and the jaws to have a screw feed as turned, and this thread corresponds to the thread cut by the jaws and the pipe.

Now it has been found that such a device where the jaws 11 are simply the shank and cutter portions substantially square in section throughout the length, the pipe when presented to the jaws and advanced by the screw thread, since it is at this end portion not guided by any means, tends to move out of the axis instead of properly engaging and entering the threaded ends of the jaws; and this is apparently the case where the end of the pipe to be threaded is not cut square or perpendicular to its axis. This will cause one side of the pipe to engage the jaw or two of the jaws, and the other jaws will not be engaged, so that the pipe will turn out of its axial position, and one or more of the jaws will be pressed by the end of the pipe. If the turning and feeding continue, something must give away, and the jaws are likely to break.

To overcome this objectionable condition I provide jaws as shown in Fig. 3 with a supporting face beyond the end having the cutting teeth on the side where the pipe enters, and which supporting faces are all located at the same distance from the axis of the head 6, and which radial distance is slightly greater than the radius of the pipe or rod on which the thread is cut by the jaws. As shown the jaws 11 are provided each with an extension 30 projecting toward the holding ring 6 for the pipe, and the inner face 31 of this extension are each located the same distance of the axis of the holder 6, slightly greater than the radius of the pipe. Each of these extensions is shown as having the outer portion of the face 31 inclined outwardly as shown at 32, these inclined faces forming guides to center the pipe and enable it to move smoothly onto the supporting faces 31.

By the use of these jaws, when the pipe 27 is passed through the holding ring 16, its end is passed between the extensions 30 until it reaches the cutting end of the jaws. Then the screws 18 are set up, and the pipe will obviously be held in this position. The pipe is then advanced by swinging the handle 26, and it must engage the thread faces of the jaws in a central position being held by the extensions 30 as advanced, and a correct thread will be formed. If the end of the pipe is irregular, the thread will start on the extended portion, but the pipe cannot swing out of the true axial position.

It will be understood that jaws of this character with the extensions can be used with a single stock member without the locking and feeding attachment, because the extensions will guide the pipe into the cutting ends of the jaws, and cause a correct thread to be produced.

While I have described one embodiment of my invention, it can be altered in form, arrangement relation and construction of parts, and modification can be made within the perview of the invention and within the scope of the claims, without departing from the spirit and import of the invention.

What I claim is:

1. The combination with a die stock having a bore for the reception of an article to be threaded of substantially greater diameter than said article, said stock also having radial chaser receiving recesses in its forward face and opening at their inner ends into said bore, of a set of threading chasers having shanks fitting said recesses and secured therein, said chasers being provided with threaded ends extending into said bore from said recesses and having extensions longitudinally of the bore and positioned to engage the unthreaded portion of the article being threaded, said extensions having their inner faces offset outwardly from the threaded portion to a slight degree, said offset faces being of substantially the same lengths as the threaded portions of the chasers and being parallel to the axis of the die stock, and bevelled faces extending outwardly and rearwardly from the rear ends of the offset faces.

2. A threading jaw having a body and a shank projecting from one side, one end of said body having the face opposite the shank provided with thread chasing cutters, the other end of said body having a face slightly offset towards the shank, said offset portion being positioned to lie parallel to the axis of an article to be threaded so as to support the unthreaded portion of such article, the extremity of the offset portion of said face being bevelled to guide the article to be threaded onto said offset face portion.

Signed at New York city, N. Y., on June 20, 1929.

LOUIS W. JONES.